United States Patent [19]

Matsuno et al.

[11] Patent Number: 5,243,394
[45] Date of Patent: Sep. 7, 1993

[54] ELECTROPHOTOGRAPHIC DEVICE PROVIDED WITH A MECHANISM FOR ATTACHING MARKS TO EDGES OF SHEETS

[75] Inventors: Junichi Matsuno, Toride; Yozo Suzumura, Fuchu; Hiroyoshi Tokoro, Nakaminato, all of Japan

[73] Assignees: Hitachi, Ltd.; Hitachi Koki Co., Ltd., both of Tokyo, Japan

[21] Appl. No.: 907,549

[22] Filed: Jul. 2, 1992

[30] Foreign Application Priority Data

Jul. 2, 1991 [JP] Japan .................. 3-161392

[51] Int. Cl.$^5$ .......................................... G03G 21/00
[52] U.S. Cl. ........................... 355/323; 355/308; 355/322
[58] Field of Search ............... 355/308, 309, 311, 321, 355/322, 323; 270/1.1, 12, 95, 58; 346/1.1

[56] References Cited

U.S. PATENT DOCUMENTS

| 1,696,999 | 1/1929 | Cannon | 270/95 X |
| 5,085,417 | 2/1992 | Copham | 270/1.1 |

FOREIGN PATENT DOCUMENTS

| 0078772 | 5/1983 | Japan | 346/1.1 |
| 0007665 | 1/1984 | Japan | 270/95 |
| 0202763 | 8/1988 | Japan | 355/323 |
| 0166561 | 10/1988 | Japan | . |
| 0255457 | 10/1990 | Japan | 270/95 |
| 0101758 | 4/1991 | Japan | 355/323 |

*Primary Examiner*—A. T. Grimley
*Assistant Examiner*—William J. Royer
*Attorney, Agent, or Firm*—Antonelli, Terry, Stout & Kraus

[57] ABSTRACT

An electrophotographic device records linear marks, according to jobs, at an edge of at least one side of a sheet. By designating according to jobs, the sorting of recorded sheets which are stacked up in a stacker is facilitated. The sheets are fed one after another by a carrier device, and thereafter an edge of the sheet is detected by a paper tip detecting device or a paper side edge detecting device. Based on the detected position of the paper edge, a linear mark K, corresponding to a position designated by a control device, is recorded on the sheet.

8 Claims, 4 Drawing Sheets

ELECTROPHOTOGRAPHIC DEVICE PROVIDED WITH A MECHANISM FOR ATTACHING MARKS TO EDGES OF SHEETS

BACKGROUND OF THE INVENTION

1. Field of the Invention

The present invention relates to an electrophotographic device for recording linear marks according to jobs at an edge of at least one side of cut four sides of each of sheets (paper) and facilitating an assortment of sheets of printed paper which are stacked up in a stacker according to the jobs.

2. Related Background Art

In a conventional electrophotographic device, as illustrated in FIG. 6, sheets (paper) 1 accumulated in a hopper 2 are fed sheet by sheet to a registration unit 5 by means of a separation unit 3. An electrostatic latent image on a photosensitive drum 6 which is recorded by a laser beam generating unit 9 is visualized and transformed into a toner image by a developing machine 7. The toner image on the photosensitive drum 6 is transferred onto the paper 1 by a transfer unit 8. The toner image is fixed onto the paper 1 by a fixing unit 12. Thereafter, the paper 1 is carried to ejection rollers 16 and ejected into a stacker 13. In the case of double-sided printing, the paper 1 is fed to a return carrier path 14 and further to an inverting unit 15. The paper 1 is carried again to the registration unit 5. The arrangement is such that the toner image remaining on the photosensitive drum 6 is cleaned by a cleaner 10. Then, the sheets of printed paper are stacked up in the stacker and sorted according to the jobs. In this case, the sheets of paper are accumulated while causing deviations of the sheets in the right-and-left directions with respect to the paper feeding direction.

A device for assorting the sheets of printed paper according to the jobs is exemplified in Japanese Unexamined Utility Model Publication No. 63-166561.

In the conventional electrophotographic device, the carrier rollers are moved right-and-left with respect to the paper feeding direction during carrying of the paper. The sheets of paper are stacked up in the stacker while causing right-and-left deviations of the paper with respect to the paper feeding direction according to the jobs. Hence, there arise the following problems. Sheets of paper having different sizes and elongate in the paper feeding direction can not follow up movements of the carrier rollers; the sheets are ill aligned; and a paper jam is easily caused.

Besides, even if the sheets are stacked up while changing alignment positions of the sheets according to the jobs, and when the operator sorts the sheets of recorded paper, the alignment positions of the sheets are disordered. There exists a possibility of a mistaken assortment.

SUMMARY OF THE INVENTION

It is a primary object of the present invention to provide an electrophotographic device capable of easily sorting sheets of printed paper which are stacked up in a stacker according to jobs.

To accomplish the foregoing object, according to one aspect of the invention, in an electrophotographic device having: a carrier unit for separately feeding sheets one after another, a transfer unit for transferring a toner image formed by a recording unit onto the sheet, a fixing unit for fixing the toner image onto the sheet, and a control unit for controlling the respective elements, A unit is provided for recording linear marks in different positions according to jobs, on the basis of a designation of the control unit at an edge of at least one side of cut four sides of the sheet, and at least one of a paper tip detecting unit and a paper side edge detecting unit for detecting the edges of the sheet fed and outputting signals to the control unit.

According to another aspect of the invention, in an electrophotographic device having a carrier unit for separately feeding sheets one after another, a transfer unit for transferring a toner image formed by a recording unit onto the sheet, a fixing unit for fixing the toner image onto the sheet, and a control unit for controlling the respective elements, a recording unit is provided for recording linear marks in different positions according to jobs, on the basis of a designation of the control unit at an edge of at least one side of cut four sides of the sheet.

Further, the recording unit includes an ink jet recording head for recording the linear marks according to the jobs by jetting an ink, and the ink jet recording head is provided in a position through which the side edge of the sheet passes or in a position within a length of the side edge from the paper tip detecting unit.

Still further, the control unit has a console incorporating a designation mechanism for designating positions of the linear marks according to the jobs which are to be recorded at the edge of the sheet.

Additionally, the control unit has a remote control terminal equipment incorporating a designation mechanism for designating positions of the linear marks according to the jobs which are to be recorded at the edge of the sheet.

Moreover, the control unit effects a process to preferentially designate positions of the linear marks according to the jobs which are to be recorded at the edge of the sheet so that a sheet filing edge coincides with a linear mark recording edge.

Furthermore, the linear marks according to the jobs are formed in monochrome or in colors.

According to still another aspect of the invention, there is provided a facsimile system comprising the electrophotographic device, whereby a recording unit works to record linear marks according to jobs and receiving stations as well.

In accordance with the present invention, the sheets (paper) are fed one after another by the carrier unit, and thereafter a passage timing of the paper edge is detected by the passage sensor (paper tip detecting unit) or the CCD array sensor (paper side edge detecting unit). Based on the detecting position of the paper edge, an electrostatic latent image of a linear mark corresponding to a position designated by the control unit is recorded on the photosensitive drum by the laser beam generating unit of the recording unit. The recorded image is transformed into a toner image by the developing machine. The toner image is printed on the paper.

BRIEF DESCRIPTION OF THE DRAWINGS

Other objects and advantages of the present invention will become apparent during the following discussion taken in conjunction with the accompanying drawings, in which.

DETAILED DESCRIPTION OF THE PREFERRED EMBODIMENTS

One embodiment of the present invention will be described with reference to FIG. 1.

Figure 1:
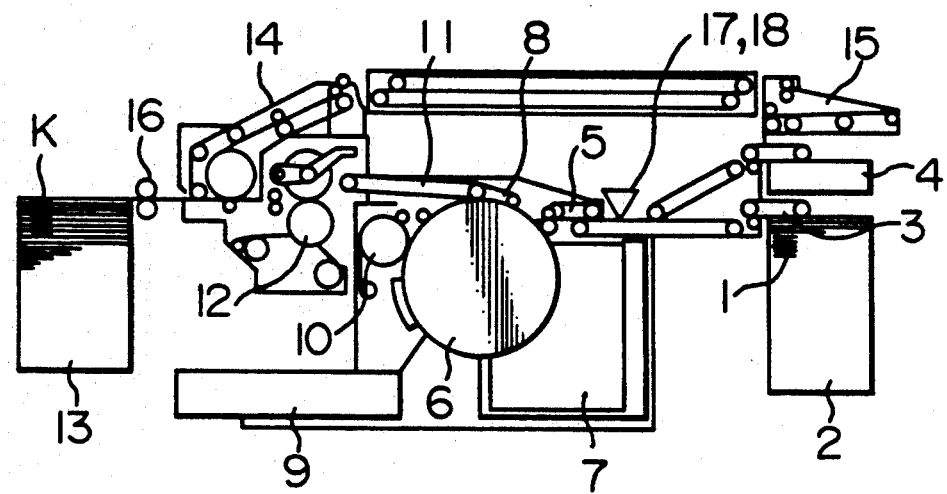
FIG. 1 is a schematic view illustrating one embodiment of the present invention.

As illustrated in FIG. 1, an electrophotographic device according to the present invention is constructed of: a separation unit 3 for feeding sheets (paper) 1 sheet by sheet which are accumulated in a hopper 2; an auxiliary hopper 4 for accumulating sheets which are fed by the same unit as a separation unit 3; a passage sensor 17 (paper tip detecting unit) for detecting a passage of the fed paper 1; a CCD array sensor (paper side edge detecting unit) 18 for detecting the passage thereof; a registration unit 5 to which the paper 1 passing through the passage sensor 17 is fed; a developing machine 7 for transforming an electrostatic latent image on a photosensitive drum 6 which is recorded by a laser beam generating unit (recording unit) 9 into a visible toner image; a transfer unit 8 for transferring the toner image on the photosensitive drum 6 onto the paper 1; a fixing unit 12 for fixing the toner image onto the paper 1; a vacuum paper handling unit 11 for transferring a sheet from a transfer unit 8 to fixing unit 12; a stacker 13 for stacking up sheets of paper 1 carried; and an unillustrated control unit for controlling respective mechanisms. Provided for double-sided printing are a return carrier path 14 for feeding the paper 1 to a inverting unit 15 and a cleaner 10 for cleaning the toner image remaining on the photosensitive drum 6. Note that a carrier unit consists of the separation unit 3, the registration unit 5, ejection rollers 16 and the return carrier path 14, while the recording unit is composed of the photosensitive drum 6 and the developing machine 7.

The operation of this embodiment will be explained.

The sheets of paper 1 which have been accumulated in the hopper 2 are fed one after another by the separation unit 3, and thereafter a passage timing of the paper tip is detected by the passage sensor 17. Based on a detecting position of the paper tip, an electrostatic latent image with a linear mark K corresponding to the position of the paper tip which is designated by the control unit is recorded on the photosensitive drum 6 by means of the laser beam generating unit 9. The recorded image is then transformed into a toner image by the developing machine 7.

Alternatively, the sheets of paper 1 which have been accumulated in the hopper 2 are fed one after another by the separation unit 3. Thereafter, the passage of the paper side edges (side edges of the paper) is detected by, e.g., the CCD array sensor 18 consisting of a plurality of optical sensors linearly arrayed in the direction substantially orthogonal to the paper carrying direction.

Based on the detecting position of the paper side edge, the electrostatic latent image with the linear mark K corresponding to the position of the paper side edge which is designated by the control unit of the electrophotographic device is recorded on the photosensitive drum 6 by means of the laser beam generating unit 9. The recorded image is then transformed into the toner image by the developing machine 7.

A printing position and the number of prints of the linear mark K vary every time the jobs changes depending on designations of the control unit of the electrophotographic device. If the printing position of the linear mark K is at the paper tip, the printing position changes according to the jobs in a main scan direction of the laser beam generating unit 9, i.e., in the direction orthogonal to the carrying direction of the paper 1. The linear mark K is printed in the form of a toner image on the paper 1. Further, if the printing position of the linear mark K is at the paper side edge, the printing position varies according to the jobs in a subscan direction of the laser beam generating unit 9, viz., in the carrying direction of the paper 1. The linear mark K is printed in the form of the toner image on the paper 1. Note that the linear marks K should be printed in positions substantially 2 mm or less apart from the respective edge surfaces of the paper 1; and a monochrome or color print may be available.

For printing the linear marks K according to the jobs, there may be provided any one or both of the passage sensor 17 for detecting the passage timing of the paper tip and, e.g. the CCD array sensor 18 for detecting the passage position of the paper side edge.

Figure 2:
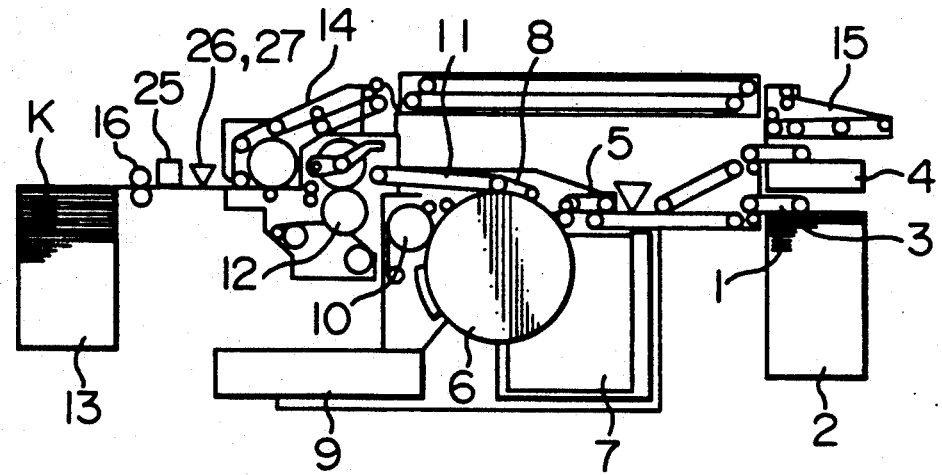
FIG. 2 is a schematic view illustrating another embodiment of the present invention.

Another embodiment of the present invention will be described referring to FIG. 2.

The arrangement is such that the linear mark K is recorded with an ink in place of the toner image by other recording unit such as, for instance, an ink jet recording system. A passage sensor 26 or a CCD array sensor 27 is provided on a carrier part leading to the ejection rollers 16. An ink jet recording head 25 is disposed in a position within a side edge length of the paper 1 from the sensor 26 or 27 in the carrying direction. The components other than the recording means are the same as those in the embodiment of FIG. 1.

The description starts with touching on a case where the linear mark K is recorded at the paper tip. After the toner image has been fixed onto the paper 1 by the fixing unit 12, a passage timing of the paper tip is detected by the passage sensor 26. Based on the detecting position of the paper tip, the linear mark K is recorded by the ink jet recording system in the position of the paper tip which is designated by the control unit of the electrophotographic device. The printing position of the linear mark K shifts when the job is changed by the control unit of the electrophotographic device. If the printing position of the linear mark K is at the paper tip, the printing position of the linear mark K changes according to the jobs by moving the ink jet recording head 25 in the main scan direction of the laser beam generating unit 9, i.e., in the direction orthogonal to the carrying direction of the paper 1. The ink jet recording head 25 may be a serial recording head movable in the direction orthogonal to the carrying direction of the paper 1 or a line recording head which does not have to move in the direction orthogonal to the carrying direction of the paper 1.

The following is an explanation of a case where the linear mark k is recorded at the paper side edge. After the toner image has been fixed onto the paper 1 by the fixing unit 12, a passage position of the paper side edge is detected by the CCD array sensor 27. Based on the detecting position of the paper tip, the linear mark K is recorded by the ink jet recording system in the position of the paper side edge which is designated by the control unit of the electrophotographic device. The printing position of the linear mark K is varied according to the jobs by the control unit. A method of changing the printing position of the linear mark K involves the steps of fixing the ink jet recording head 25 and varying a recording timing.

For printing the linear marks K according to the jobs, there may be provided either or both of the passage sensor 26 for detecting the passage timing of the paper tip and, e.g., the CCD array sensor 27 for detecting the passage position of the paper side edge.

The sheets of paper 1 on which the linear marks K according to the jobs have been printed are housed in alignment in the stacker 13 through the ejection rollers 16.

Figure 3:
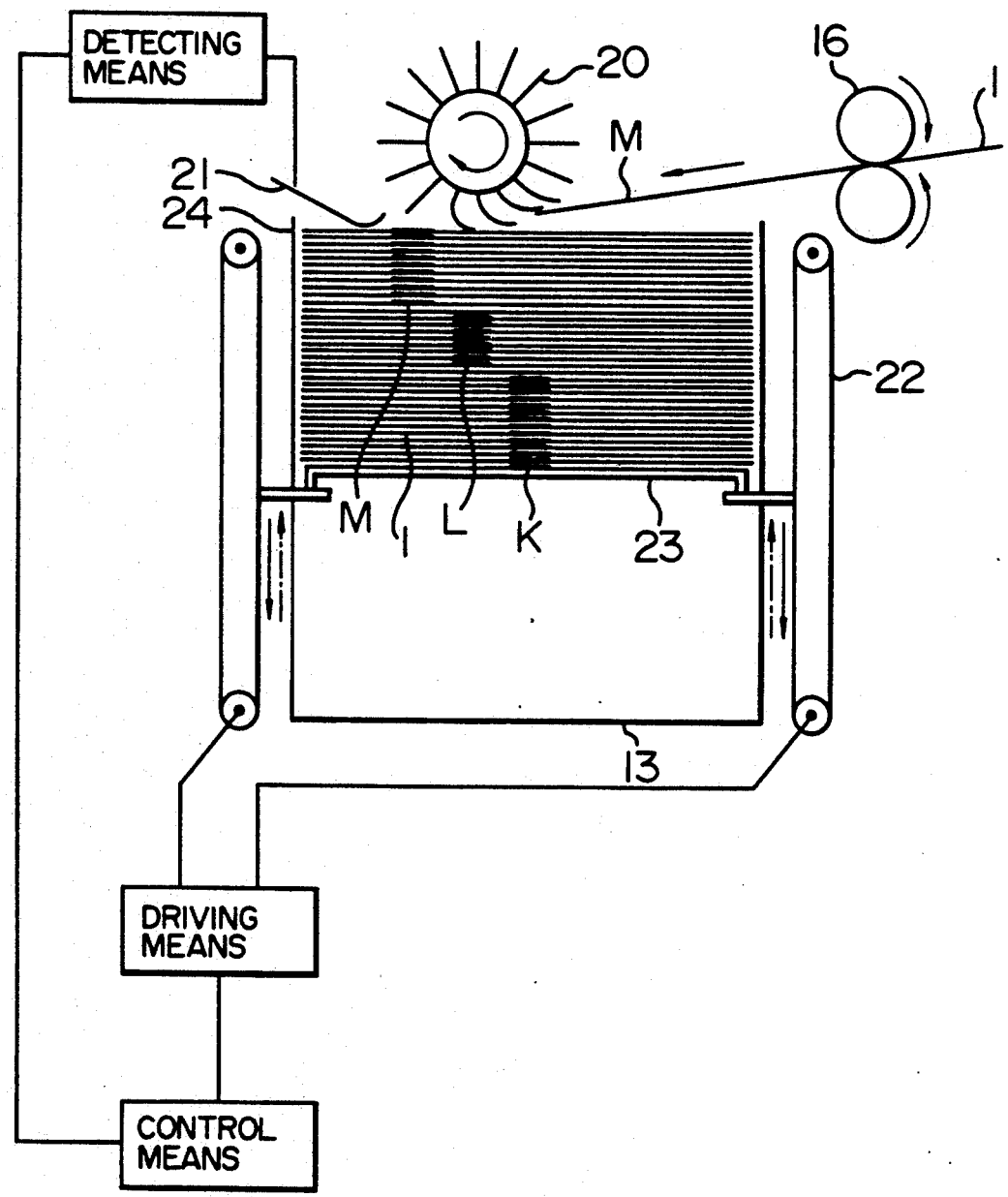
FIG. 3 is a view of a stacker, showing the embodiment of the present invention.

FIG. 3 is a view illustrating a construction of the stacker 13. The operation thereof will be explained.

The paper 1 is, after being ejected into the stacker 13 by the ejection rollers 16, fed up to a stopper 24 while a proper carrying force from an impeller 20 acts on the tip of the paper 1. With respect to a height position of the sheets of paper 1 within the stacker 13, a position of the uppermost paper 1 is detected by a height sensor 21. A height of a mount 23 is controlled by rotating a belt 22 with a driving means so that the uppermost paper 1 is invariably in a designated position.

Figure 4:
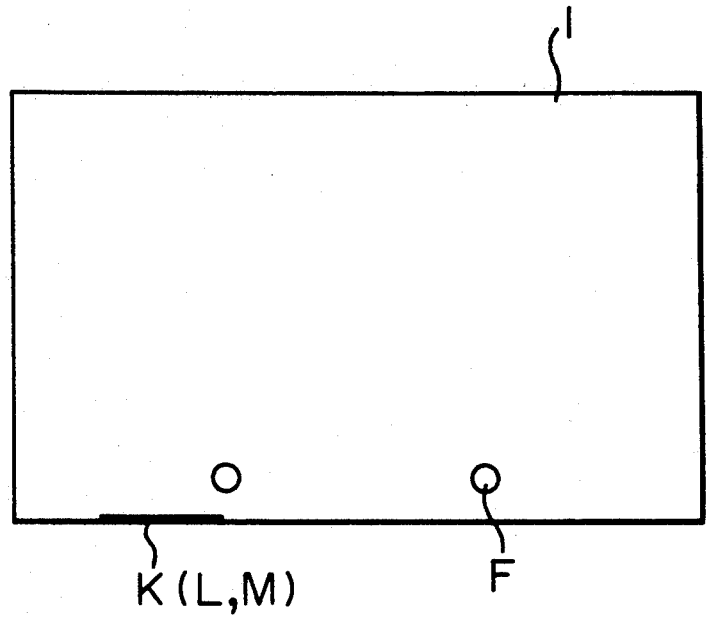
FIG. 4 is a view of a system, showing the embodiment of the present invention.
Figure 6:
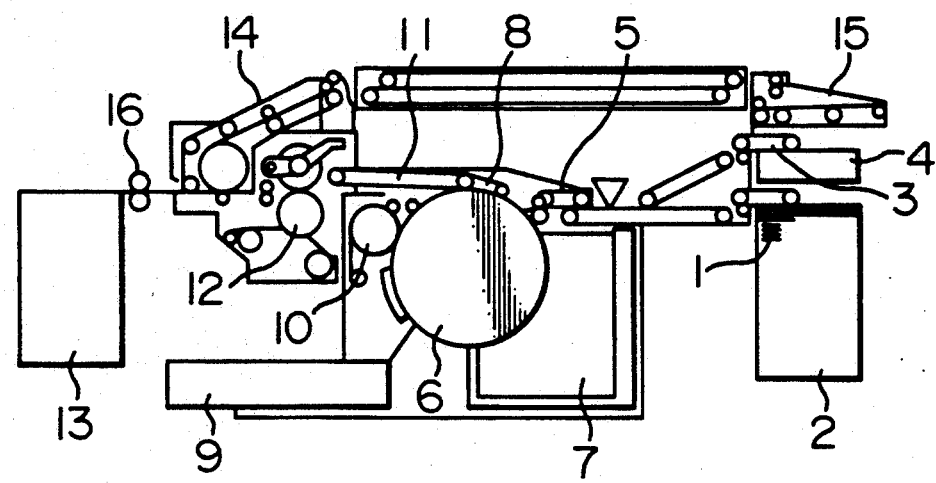
FIG. 6 is a view showing a prior art.

On the other hand, a toner image based on the record information is transferred and fixed onto the paper 1 aligned within the stacker 13. Further, the linear mark K according to the jobs as shown in FIG. 4 is recorded in the form of a toner image or with an ink at the side edge of the paper 1 according to the jobs. When the sheets of paper 1 are thereby stacked in alignment in the stacker 13, the edges of the sheets of paper 1 at which the linear marks K, L, M are recorded appear to be vertical stripes as seen in FIG. 3. It is therefore possible to readily sort the sheets of recording paper by changing the positions of the linear marks K, L, M according to the jobs. Note that the linear marks K, L, M are printed preferably at the side edge of the paper 1 on the same side as punch holes F.

When the linear mark is printed at the paper tip, the linear mark can be easily conformed by taking the paper out of the stacker.

Figure 5:
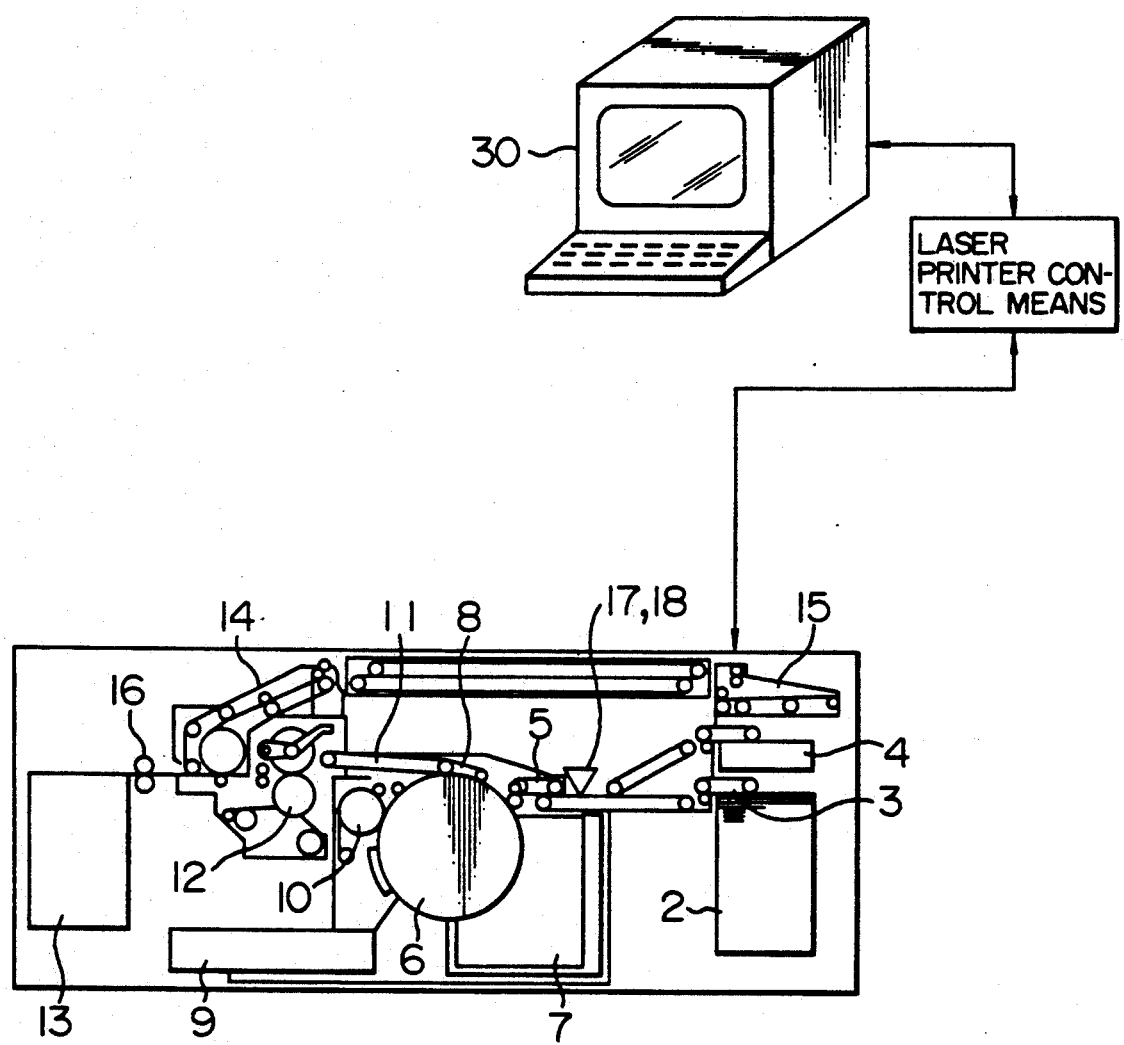
FIG. 5 is an enlarged view depicting the principal portion of FIG. 4.

FIG. 5 demonstrates one embodiment of a system construction for recording the linear marks K, L, M. In the control unit of a laser printer (electrophotographic device), the respective mechanisms of the laser printer are controlled based on the record information transmitted from a computer system 30. Then, the linear marks are recorded automatically or under a user's designation with the intention of distinguishing the continuous jobs. The linear marks may be recorded in monochrome or in colors.

The following is a description of how the control means is constructed. A console of a remote control terminal equipment incorporates a designation mechanism for designating the positions of the linear marks according to the jobs which are to be recorded at the edges of the sheets. Effected preferentially is a designation of the positions of the linear marks according to the jobs which are to be recorded at the edges of the sheets so that the position of the sheet filing edge coincides with that of the linear mark recording edge.

A facsimile system is equipped with the electrophotographic device constructed above. The recording means is constructed to record the linear marks according to the jobs and the receiving stations as well.

In accordance with the present invention, the locations and the number of sheets are designated, and the linear marks according to the jobs are recorded at the edge of at least one side of cut four sides of the sheet according to the jobs. It is therefore unnecessary to stack up the sheets in the stacker while causing deviations in the right-and-left directions with respect to the carrying direction of the sheet according to the jobs. This leads to such advantages that an obstacle such as a jam disappears, and the sheets of paper are well aligned in the stacker.

Although the illustrative embodiments of the present invention have been described in detail with reference to the accompanying drawings, it is to be understood that the present invention is not limited to those embodiment. Various changes of modifications may be effected by one skilled in the art without departing from the scope or spirit of the invention.

What is claimed is:

1. In an electrophotographic device having:
   a carrier means for separately feeding sheets one after another;
   a transfer means for transferring a toner image formed by a recording unit onto a sheet;
   a fixing means for fixing said toner image onto said sheet; and
   a control means for controlling said carrier means, said transfer means, and said fixing means,
   the improvement comprising
   a recording means for recording linear marks in different positions, according to jobs, based on a designation of said control means at an edge of at least one side of cut four sides of said sheet; and at least one of a paper tip detecting means and a paper side edge detecting means for detecting an edge of said sheet fed and outputting signals to said control means.

2. The electrophotographic device as set forth in claim 1, wherein said recording means includes an ink jet recording head for recording said linear marks according to the jobs by jetting an ink, and said ink jet recording head is provided in a position through which the side edge of said sheet passes or in a position within a length of the side edge from said paper tip detecting means.

3. An electrophotographic device comprising:
   a carrier means for separately feeding sheets one after another;
   a transfer means for transferring a toner image formed by a recording unit onto a sheet;
   a fixing means for fixing said toner image onto said sheet; and
   a control means for controlling said carrier means, said transfer means, and said fixing means, and
   a recording means for recording linear marks in different positions according to jobs, based on a designation of said control means at an edge of at least one side of cut four sides of said sheets; and
   a detecting means for detecting an edge of said sheet fed and for outputting a signal indicative thereof to said control means.

4. The electrophotographic device as set forth in claim 1 or 3, wherein said control unit has a console incorporating a designation mechanism for designating positions of said linear marks according to the jobs which are to be recorded at the edge of said sheet.

5. The electrophotographic device as set forth in claim 1 or 3, wherein said control means has a remote control terminal equipment incorporating a designation mechanism for designating positions of said linear marks according to the jobs which are to be recorded at the edge of said sheet.

6. The electrophotographic device as set forth in claim 1 or 3, wherein said control means effects a process to preferentially designate positions of said linear marks according to the jobs which are to be recorded at the edge of said sheet so that a sheet filing edge coincides with a linear mark recording edge.

7. The electrophotographic device as set forth in claim 1 or 3, wherein said linear marks according to the jobs are formed in monochrome or in colors.

8. A facsimile system comprising
an electrophotographic device having:
    a carrier means for separately feeding sheets one after another;
    a transfer means for transferring a tone image formed by a recording means onto a sheet;
    a fixing means for fixing said toner image onto said sheet; and
    a control means for controlling said carrier means, said transfer means, and said fixing means,
    a recording means for recording linear marks in different positions, according to jobs, based on a designation of said control means at an edge of at least one side of cut four sides of said sheet; and
    at least one of a paper tip detecting means and a paper side edge detecting means for detecting an edge of said sheet fed and outputting signals to said control means, said recording means further recording linear marks according to receiving stations.

* * * * *